US008296183B2

(12) United States Patent
Evans

(10) Patent No.: US 8,296,183 B2
(45) Date of Patent: Oct. 23, 2012

(54) SYSTEM AND METHOD FOR DYNAMIC LAYOUT INTELLIGENCE

(75) Inventor: Jon C. Evans, Sarasota, FL (US)

(73) Assignee: eComSystems, Inc., Sarasota, FL (US)

( * ) Notice: Subject to any disclaimer, the term of this patent is extended or adjusted under 35 U.S.C. 154(b) by 122 days.

(21) Appl. No.: 12/829,543

(22) Filed: Jul. 2, 2010

(65) Prior Publication Data

US 2011/0125591 A1    May 26, 2011

Related U.S. Application Data

(60) Provisional application No. 61/254,399, filed on Nov. 23, 2009.

(51) Int. Cl.
*G06Q 30/00*    (2006.01)

(52) U.S. Cl. .................. 705/14.43; 705/14.72

(58) Field of Classification Search ............... 705/14.16, 705/14.43, 14.4, 14.49, 14.65, 14.72, 14.73; 709/238, 203, 223; 715/201, 205, 234, 243, 715/244

See application file for complete search history.

(56) References Cited

U.S. PATENT DOCUMENTS

| | | | |
|---|---|---|---|
| 4,332,998 A | 6/1982 | Boros | |
| 4,426,629 A | 1/1984 | Fouse | |
| 4,529,006 A | 7/1985 | Block et al. | |
| 4,580,950 A | 4/1986 | Sumikawa et al. | |
| 4,873,073 A | 10/1989 | Matsui | |
| 4,982,343 A | 1/1991 | Hourvitz et al. | |
| 5,161,109 A | 11/1992 | Keating et al. | |
| 5,347,632 A | 9/1994 | Filepp et al. | |
| 5,381,523 A | 1/1995 | Hayashi | 395/145 |
| 5,382,779 A | 1/1995 | Gupta | |
| 5,459,826 A | 10/1995 | Archibald | |
| 5,535,320 A | 7/1996 | Gay et al. | |
| 5,541,991 A | 7/1996 | Benson et al. | |
| 5,555,496 A | 9/1996 | Tackbary et al. | |
| 5,649,186 A | 7/1997 | Ferguson | 395/610 |
| 5,649,216 A | 7/1997 | Sieber | |
| 5,680,619 A | 10/1997 | Gudmundson et al. | |
| 5,740,425 A | 4/1998 | Povilus | |
| 5,748,484 A | 5/1998 | Cannon et al. | |
| 5,749,083 A | 5/1998 | Koda et al. | 707/530 |
| 5,860,073 A | 1/1999 | Ferrel et al. | 707/522 |
| 5,870,718 A | 2/1999 | Spector | |
| 5,873,073 A | 2/1999 | Bresnan et al. | 705/410 |

(Continued)

FOREIGN PATENT DOCUMENTS

WO    WO 98/08176    2/1998

(Continued)

OTHER PUBLICATIONS

PageXpress Promotional Materials and User Manual, 1998.

(Continued)

*Primary Examiner* — Andrew Joseph Rudy
(74) *Attorney, Agent, or Firm* — Remenick PLLC

(57) ABSTRACT

Methods, systems, and computer readable media for of automatically rendering an advertisement element on an advertisement are disclosed. The method includes the steps of obtaining an advertisement element to be rendered on the advertisement, comparing the advertisement element to a set of stored markup records, determining which stored markup record is closest in at least one attribute to the advertisement element, rendering the advertisement element in accordance with the closest markup record, and displaying the rendered advertisement element on the advertisement.

12 Claims, 2 Drawing Sheets

U.S. PATENT DOCUMENTS

| | | | |
|---|---|---|---|
| 5,890,175 A | 3/1999 | Wong et al. | |
| 5,907,704 A | 5/1999 | Gudmundson et al. | |
| 5,926,825 A | 7/1999 | Shirakawa | |
| 5,930,810 A | 7/1999 | Farros et al. | 707/506 |
| 5,933,811 A | 8/1999 | Angles et al. | |
| 5,956,736 A | 9/1999 | Hanson et al. | 707/513 |
| 5,963,968 A | 10/1999 | Warmus et al. | 707/517 |
| 5,974,396 A | 10/1999 | Anderson et al. | |
| 5,983,227 A | 11/1999 | Nazem et al. | 707/10 |
| 5,983,243 A | 11/1999 | Heiney et al. | 707/500 |
| 5,986,670 A | 11/1999 | Dries et al. | |
| 5,987,454 A | 11/1999 | Hobbs | 707/4 |
| 5,999,912 A | 12/1999 | Wodarz et al. | 705/14 |
| 6,005,560 A | 12/1999 | Gill et al. | |
| 6,009,410 A | 12/1999 | LeMole et al. | 705/14 |
| 6,026,417 A | 2/2000 | Ross et al. | 707/517 |
| 6,052,514 A | 4/2000 | Gill et al. | |
| 6,064,967 A | 5/2000 | Speicher | |
| 6,081,262 A | 6/2000 | Gill et al. | |
| 6,094,186 A | 7/2000 | Kuroda et al. | 345/146 |
| 6,108,673 A | 8/2000 | Brandt et al. | 707/505 |
| 6,118,449 A | 9/2000 | Rosen et al. | |
| 6,119,101 A | 9/2000 | Peckover | |
| 6,144,944 A | 11/2000 | Kurtzman, II et al. | |
| 6,167,382 A | 12/2000 | Sparks et al. | 705/26 |
| 6,182,050 B1 | 1/2001 | Ballard | |
| 6,192,382 B1 | 2/2001 | Lafer et al. | |
| 6,216,112 B1 | 4/2001 | Fuller et al. | |
| 6,243,375 B1 | 6/2001 | Speicher | |
| 6,247,047 B1 | 6/2001 | Wolff | |
| 6,286,005 B1 | 9/2001 | Cannon | |
| 6,311,211 B1 | 10/2001 | Shaw et al. | |
| 6,334,109 B1 | 12/2001 | Kanevsky | |
| 6,356,903 B1 | 3/2002 | Baxter et al. | |
| 6,385,592 B1 | 5/2002 | Angles et al. | |
| 6,401,075 B1 | 6/2002 | Mason et al. | |
| 6,415,316 B1 | 7/2002 | Van Der Meer | |
| 6,446,045 B1 | 9/2002 | Stone et al. | |
| 6,473,794 B1 | 10/2002 | Guheen et al. | |
| 6,484,149 B1 | 11/2002 | Jammes et al. | |
| 6,496,857 B1 | 12/2002 | Dustin et al. | |
| 6,513,035 B1 | 1/2003 | Tanaka et al. | |
| 6,519,571 B1 | 2/2003 | Guheen et al. | |
| 6,553,178 B2 | 4/2003 | Abecassis | |
| 6,587,835 B1 | 7/2003 | Treyz et al. | |
| 6,589,292 B1 | 7/2003 | Langford-Wilson | |
| 6,604,088 B1 | 8/2003 | Landom et al. | |
| 6,611,348 B1 | 8/2003 | Chase et al. | |
| 6,611,349 B1 | 8/2003 | Vogt et al. | |
| 6,618,504 B1 | 9/2003 | Yoshino | |
| 6,628,314 B1 | 9/2003 | Hoyle | |
| 6,633,666 B2 | 10/2003 | Gill et al. | |
| 6,633,668 B1 | 10/2003 | Newman | |
| 6,643,650 B1* | 11/2003 | Slaughter et al. | 1/1 |
| 6,671,818 B1 | 12/2003 | Mikurak | |
| 6,684,369 B1 | 1/2004 | Bernardo et al. | |
| 6,691,093 B2 | 2/2004 | Shell | |
| 6,718,551 B1 | 4/2004 | Swix et al. | |
| 6,725,203 B1 | 4/2004 | Seet | |
| 6,738,978 B1 | 5/2004 | Hendricks et al. | |
| 6,748,397 B2 | 6/2004 | Choi | |
| 6,763,334 B1 | 7/2004 | Matsumoto et al. | |
| 6,763,336 B1 | 7/2004 | Kolls | |
| 6,792,466 B1 | 9/2004 | Saulpaugh | |
| 6,799,327 B1 | 9/2004 | Reynolds et al. | |
| 6,804,659 B1 | 10/2004 | Graham | |
| 6,829,587 B2 | 12/2004 | Stone et al. | |
| 6,829,780 B2 | 12/2004 | Kraft et al. | |
| 6,847,969 B1 | 1/2005 | Mathai et al. | |
| 6,850,979 B1* | 2/2005 | Saulpaugh et al. | 709/225 |
| 6,865,262 B1 | 3/2005 | Mitts | |
| 6,918,084 B1* | 7/2005 | Slaughter et al. | 715/205 |
| 6,920,606 B1 | 7/2005 | Jablonski | |
| 6,931,591 B1 | 8/2005 | Brown et al. | |
| 6,940,518 B2 | 9/2005 | Minner et al. | |
| 6,947,959 B1 | 9/2005 | Gill | |
| 6,976,003 B1 | 12/2005 | Hamor | |
| 6,976,006 B1 | 12/2005 | Verma et al. | |
| 7,028,072 B1* | 4/2006 | Kliger et al. | 709/203 |
| 7,062,466 B2 | 6/2006 | Wagner | |
| 7,069,228 B1 | 6/2006 | Rose et al. | |
| 7,072,858 B1 | 7/2006 | Litzow | |
| 7,073,188 B2* | 7/2006 | Lemmons et al. | 725/47 |
| 7,103,904 B1 | 9/2006 | Blackketter | |
| 7,107,522 B1* | 9/2006 | Morgan et al. | 715/201 |
| 7,109,985 B2 | 9/2006 | Spencer et al. | |
| 7,120,591 B1 | 10/2006 | Solomon et al. | |
| 7,136,871 B2* | 11/2006 | Ozer et al. | 1/1 |
| 7,143,066 B2 | 11/2006 | Shear et al. | |
| 7,143,160 B2 | 11/2006 | Tamaki | |
| 7,149,698 B2 | 12/2006 | Guheen et al. | |
| 7,159,175 B2 | 1/2007 | Ishii et al. | |
| 7,165,039 B2 | 1/2007 | Seet et al. | |
| 7,165,041 B1 | 1/2007 | Guheen et al. | |
| 7,181,445 B2 | 2/2007 | Bebo et al. | |
| 7,188,137 B2 | 3/2007 | Inoue | |
| 7,200,853 B2 | 4/2007 | Kawai | |
| 7,213,027 B1 | 5/2007 | Kominek et | |
| 7,240,025 B2* | 7/2007 | Stone et al. | 705/14.16 |
| 7,249,059 B2* | 7/2007 | Dean et al. | 705/14.73 |
| 7,266,733 B2 | 9/2007 | Bazinet et al. | |
| 7,281,001 B2 | 10/2007 | Caulfield et al. | |
| 7,292,723 B2 | 11/2007 | Tedesco et al. | |
| 7,312,772 B2 | 12/2007 | Kim | |
| 7,315,983 B2 | 1/2008 | Evans et al. | |
| 7,319,976 B1 | 1/2008 | Peckover | |
| 7,343,354 B2 | 3/2008 | Hennessey | |
| 7,356,547 B2* | 4/2008 | Ozer et al. | 1/1 |
| 7,370,091 B1* | 5/2008 | Slaughter et al. | 709/220 |
| 7,403,978 B2 | 7/2008 | Parekh | |
| 7,418,451 B2 | 8/2008 | Leung et al. | |
| 7,421,467 B2 | 9/2008 | Kaneko et al. | |
| 7,434,160 B2 | 10/2008 | Peiro et al. | |
| 7,451,041 B2* | 11/2008 | Laumeyer et al. | 701/420 |
| 7,469,245 B2 | 12/2008 | Skillen et al. | |
| 7,469,943 B2 | 12/2008 | Hiramoto | |
| 7,480,693 B2 | 1/2009 | Kaneko et al. | |
| 7,483,946 B2 | 1/2009 | Boyd | |
| 7,493,648 B2 | 2/2009 | Hisamatsu | |
| 7,496,943 B1 | 2/2009 | Goldberg et al. | |
| 7,533,034 B2 | 5/2009 | Laurin et al. | |
| 7,536,316 B2* | 5/2009 | Ozer et al. | 705/14.47 |
| 7,548,874 B2 | 6/2009 | Kanevsky et al. | |
| 7,653,603 B1 | 1/2010 | Holtkamp, Jr. et al. | |
| 7,783,777 B1* | 8/2010 | Pabla et al. | 709/238 |
| 7,870,023 B2* | 1/2011 | Ozer et al. | 705/14.4 |
| 7,890,873 B2 | 2/2011 | Evans | |
| 8,005,715 B2* | 8/2011 | Smith et al. | 705/14.25 |
| 8,010,979 B2* | 8/2011 | Lemmons et al. | 725/47 |
| 8,032,835 B1 | 10/2011 | Clevenger | |
| 8,091,031 B2 | 1/2012 | Evans | |
| 8,117,531 B1* | 2/2012 | Lueck | 715/204 |
| 8,156,176 B2* | 4/2012 | Lerman et al. | 709/203 |
| 2002/0036654 A1 | 3/2002 | Evans et al. | |
| 2006/0253327 A1* | 11/2006 | Morris et al. | 705/14 |
| 2007/0266326 A1 | 11/2007 | Evans et al. | |
| 2008/0120185 A1 | 5/2008 | Evans et al. | |
| 2008/0126204 A1 | 5/2008 | Evans et al. | |
| 2008/0126205 A1 | 5/2008 | Evans et al. | |
| 2008/0183577 A1 | 7/2008 | Evans | |
| 2009/0216606 A1* | 8/2009 | Coffman et al. | 705/10 |
| 2009/0292984 A1* | 11/2009 | Bauchot et al. | 715/234 |
| 2010/0324997 A1 | 12/2010 | Evans | |
| 2011/0125586 A1 | 5/2011 | Evans | |
| 2011/0213655 A1* | 9/2011 | Henkin et al. | 705/14.49 |
| 2011/0225591 A1 | 9/2011 | Wada et al. | |

FOREIGN PATENT DOCUMENTS

| | | |
|---|---|---|
| WO | WO9917258 | 4/1999 |

OTHER PUBLICATIONS

Page Perfect Promotion Materials and User's Manual, 2000.
Page Perfect User Guide, 1999.
Purchase Order 10744, 1999.
Invoice 24437, 1999.
Invoice 25021, 1999.

Memorandum Rick Davis to Bill Hurley, 1999.
E-mail from hostmaster@internic.net., 1999, registration of adsembly.com.
E-mail from hostmaster@internic.net., 1999, registration of adsembly.net.
Safeway Project Review, 1999.
ADsembly Help Guide (ADsembly Importer and ADsembly Preflight).
Response to Supervalu RFP, 2000.
Supervalu Questions and Answers, 1999.
Supervalu ADsembly Workflow, 2000.
Supervalu ADsembly Help Guide, 2000.

Catalog Maker, 1997.
Page Perfect User Guide.
Safeway Project Review.
MediaNet Webpage, dated Dec. 12, 1997.
Initial Disclosure, dated Mar. 9, 2011.
eCircular User's Guide, dated 2000.
MediaNet Webpage dated Dec. 12, 1997.
AAS Webpage dated Oct. 14, 1999.
eCircular User's Guide.
Initial Disclosure.

* cited by examiner

SYSTEM AND METHOD FOR DYNAMIC LAYOUT INTELLIGENCE

REFERENCE TO RELATED APPLICATIONS

This application claims priority to U.S. Provisional Application Ser. No. 61/254,399, filed Nov. 23, 2009, entitled "System and Method for Computer-Created Advertisements," which is specifically and entirely incorporated by reference.

BACKGROUND OF THE INVENTION

1. Field of the Invention

This invention relates to the field of creating advertisements, and more particularly to the field of dynamically laying out elements of an advertisement.

2. Introduction

Conventional business methods for creating advertising require that written materials and other documentation be provided by a customer (which we will refer to herein as the user) to third party graphic artists who design the layout. The customer must wait to receive a hard-copy proof from the artists, and then, after reviewing and revising the proof, resend the proof to the artists for redesign. When the proof is finally approved, the information must be delivered to a commercial printer to produce the advertisements in their final form. At each stage of the process, there can be substantial delays. After one or more redesigns, the customer must wait for a final proof and then, once approved, wait for the final product to be produced.

The conventional process is time consuming and inefficient, and can also be very expensive relative to the cost of services that can be provided by the present invention. For example, a customer must employ the services of a graphic artist, which can add significant cost to the process. Moreover, the inclusion of a graphic artist into the process requires additional time and communications between the artist and the customer. Each time the work-in-process is transferred between parties (for example, from the graphic artist to the customer, from the customer to the graphic artist, and from the graphic artist to the printer), the work-in-process must enter the queue of the recipient, which may add uncontrollable delays, not to mention the time associated with the logistics of transferring materials. Accordingly, there is a need for an improved system that is less time consuming and less costly.

SUMMARY

The present invention overcomes the problems and disadvantages associated with current strategies and designs and provides new systems and methods of dynamically creating advertisements.

One embodiment of the invention is directed to a method of automatically rendering an advertisement element on an advertisement. The method comprises the steps of obtaining an advertisement element to be rendered on the advertisement from a user, comparing the advertisement element to a set of stored markup records, determining which stored markup record is closest in at least one attribute to the advertisement element, rendering the advertisement element in accordance with the closest markup record, and displaying the rendered advertisement element on the advertisement.

In preferred embodiments, the advertisement element is chosen from a database of advertisement elements or created newly by a user. Preferably, the set of stored markup records includes at least one markup record previously saved by the user. In such embodiments, the method further comprises determining if the at least one stored markup record saved by the user is within a predetermined variance in at least one attribute to the advertisement element, rendering the advertisement element in accordance with the markup record saved by the user if the markup record saved by the user is within the predetermined variance, or rendering the advertisement element in accordance with the closest markup record saved by another if the markup record saved by the user is not within the predetermined variance. In the preferred embodiment, the variance is within a 10% height to width ratio.

In the preferred embodiment, the method further comprises obtaining customizations to the rendered advertisement element from the user, and saving the customizations as a new markup record. Preferably, the at least one attribute is chosen from advertisement element height to width ratio, image height to width ratio, advertisement dimensions, image dimensions, text dimensions, text content, and advertisement content. If there are no stored markup records or no markup record is close in at least one attribute to the advertisement element, the advertisement element is preferably distributed evenly on the advertisement.

In a preferred embodiment, the markup record comprises style preferences of the user and others. The style preferences may include at least one of image size, image position, text size, text font, text color, text position, background color, and rotation. Preferably, the advertisement element is rendered in accordance with the style preferences of the markup record and the advertisement element comprises at least one of text, an image, and a background.

Another embodiment of the invention is directed to a system for automatically rendering an advertisement element on an advertisement. The system comprises a system bus for coupling system components, at least one database coupled to the system bus, a processing unit in communication with the database, software executing on the processing unit, an input device in communication with the processing unit, and an output device in communication with the processing unit. The software obtains an advertisement element to be rendered on the advertisement from a user, compares the advertisement element to a set of stored markup records stored in the database, determines which stored markup record is closest in at least one attribute to the advertisement element, renders the advertisement element in accordance with the closest markup record, and displays the rendered advertisement element on the advertisement.

In a preferred embodiment, the advertisement element is chosen from a database of advertisement elements or created newly by a user. Preferably, the set of stored markup records includes at least one markup record previously saved by the user. In a preferred embodiment, the software further determines if the at least one stored markup record saved by the user is within a predetermined variance in at least one attribute to the advertisement element, renders the advertisement element in accordance with the markup record saved by the user if the markup record saved by the user is within the predetermined variance, or renders the advertisement element in accordance with the closest markup record saved by another if the markup record saved by the user is not within the predetermined variance. Preferably, the variance is within a 10% height to width ratio.

In a preferred embodiment, the software further obtains customizations to the rendered advertisement element from the user, and saves the customizations as a new markup record. Preferably, the at least one attribute is chosen from advertisement element height to width ratio, image height to width ratio, advertisement dimensions, image dimensions, text dimensions, text content, and advertisement content.

If there are no stored markup records or no markup record is close in at least one attribute to the advertisement element, the advertisement element is preferably distributed evenly on the advertisement. In the preferred embodiment, the markup record comprises style preferences of the user and others. The style preferences can include at least one of image size, image position, text size, text font, text color, text position, background color, and rotation. preferably the advertisement element is rendered in accordance with the style preferences of the markup record and the advertisement element comprises at least one of text, an image, and a background.

Another embodiment of the invention is directed toward a computer-readable media containing program instructions for automatically rendering an advertisement element on an advertisement, that causes a computer to obtain an advertisement element to be rendered on the advertisement from a user, compare the advertisement element to a set of stored markup records, determine which stored markup record is closest in at least one attribute to the advertisement element, render the advertisement element in accordance with the closest markup record, and display the rendered advertisement element on the advertisement.

In a preferred embodiment, the advertisement element is chosen from a database of advertisement elements or created newly by a user. Preferably, the set of stored markup records includes at least one markup record previously saved by the user. Preferably, the media further causes the computer to determine if the at least one stored markup record saved by the user is within a predetermined variance in at least one attribute to the advertisement element, render the advertisement element in accordance with the markup record saved by the user if the markup record saved by the user is within the predetermined variance, or render the advertisement element in accordance with the closest markup record saved by another if the markup record saved by the user is not within the predetermined variance. Preferably, the variance is within a 10% height to width ratio.

In a preferred embodiment, the media further causes the computer to obtain customizations to the rendered advertisement element from the user, and save the customizations as a new markup record. Preferably, the at least one attribute is chosen from advertisement element height to width ratio, image height to width ratio, advertisement dimensions, image dimensions, text dimensions, text content, and advertisement content.

If there are no stored markup records or no markup record is close in at least one attribute to the advertisement element, the advertisement element is preferably distributed evenly on the advertisement. Preferably, the markup record comprises style preferences of the user and others. The style preferences can include at least one of image size, image position, text size, text font, text color, text position, background color, and rotation. In the preferred embodiment, the advertisement element is rendered in accordance with the style preferences of the markup record and the advertisement element comprises at least one of text, an image, and a background.

Other embodiments and advantages of the invention are set forth in part in the description, which follows, and in part, may be obvious from this description, or may be learned from the practice of the invention.

BRIEF DESCRIPTION OF THE DRAWINGS

The invention is described in greater detail by way of example only and with reference to the attached drawings, in which.

DETAILED DESCRIPTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
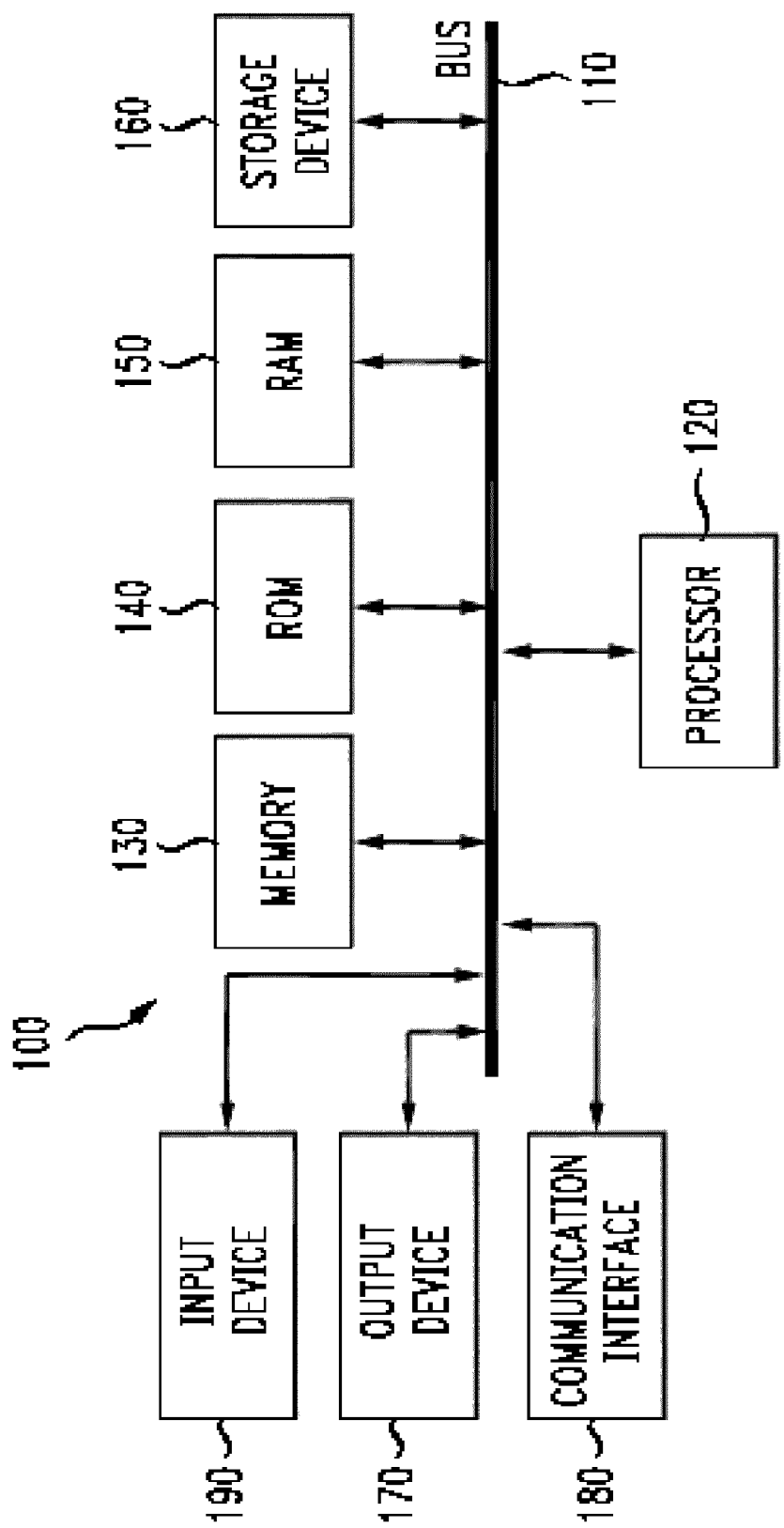
FIG. 1 illustrates an example system embodiment.

With reference to FIG. 1, an exemplary system includes at least one general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, a computer server, or a wireless devices, including wireless Personal Digital Assistants ("PDAs") (e.g., Palm™ VII, Research in Motion's Blackberry™, Apple's iPhone™), wireless web-enabled phones, other wireless phones, etc.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can be one or more of a number of output mechanisms known to those of skill in the art, for example, printers, monitors, projectors, speakers, and plotters. In some embodiments, the output can be via a network interface, for example uploading to a website, emailing, attached to or placed within other electronic files, and sending an SMS or MMS message. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the preferred embodiment, a user utilizes an Internet connection in order to access a website on a host computer. The web site may, for example, be maintained and hosted by a commercial printer, a supplier, or an Internet Service Provider. The website, when accessed, may request a user to log into the site by entering a username and password. In the preferred embodiment, users will log in using a User Name and Password. However, in certain embodiments, additional information can be required, for example store number or company identification. The User Name and Password can be an email address or combination of letters, numbers, and/or symbols. Preferably, each User Name is unique. Based on user identification, access to the system can be determined. Furthermore, based on user identification, a user's preferences, saved advertisements, accessible databases, and other resources the user has access to, is uploaded.

In the preferred embodiment, the user will be presented with the choice of starting a new advertisement or loading a pre-existing advertisement. If the user chooses to load a pre-existing advertisement, the pre-existing advertisement may be saved on a server, the user's work station, or at another location. Furthermore, the pre-existing advertisement may be an advertisement created by another user. If the user chooses to start a new advertisement, the user will be presented with a choice of advertising formats. Generally, a user will specify the advertising format that is desired. Preferably, the user selects an advertising format from a plurality of advertising formats displayed on the computer screen. More preferably, the user selects from a menu of advertising formats. An advertising format establishes the type of advertisement that is desired. Examples include circulars that are distributed by hand to potential users, newspaper inserts that are distributed as part of a newspaper, direct mail advertisements that are mailed directly to potential users, newsletters that are distributed to existing clients in order to keep them informed, and banners. Advertising materials that may be generated using the present invention are not limited to these examples, but may include any kind of print, digital, electronic or other form of advertisement, including, but not limited to, post cards, coupons, price cards, shelf-talkers, posters, signage, flyers, run-of-press (ROP) or other newspaper or magazine ads, digital displays or signs, billboards, presentations, website ads, text messages (e.g. SMS or MMS), social media advertisements, product sheets, catalogs, order guides, brochures, collateral materials, letterhead, business cards, pocket folders, display materials, web banners, pop-up advertisements, reports, digital proofs and other types of advertisements, literature, and printed or electronic materials.

Once an advertisement format is chosen, the user will have the opportunity to customize the advertisement format. For example, the user may choose the number of pages, size of the pages or advertisement, number of elements per page, themes (i.e. seasonal themes, holiday themes, color pallets), and font style. Once an advertising format has been selected and customized, a user may select a template that corresponds to the selected advertising format. In one embodiment, the present invention will provide a one-to-one correspondence between available advertising formats and templates. It is recognized and understood, however, that a selected advertising format may have a plurality of templates that correspond to the selected format. Moreover, different advertising formats may share one or more templates. In the case of a one-to-one correspondence, the selection of an advertising format may pre-ordain the selection of a template.

Preferably, after selecting an advertising format, the user will be provided with an opportunity to select one of a plurality of templates that correspond to a selected advertising format. For example, if a circular is chosen as an advertising format, the user may be presented with a plurality of pre-defined templates for a circular. By selecting one of the pre-defined templates, the user will be able to save much time in designing a custom circular. It is understood and acknowledged, however, that the present invention may also be designed to permit a user to have even greater flexibility by presenting a template that provides a user with greater flexibility in terms of overall layout and design.

Once a template is chosen, the user is provided with an opportunity to customize the template. In the case where a template involves multiple pages, the user may be provided with an opportunity to select a page of the template to design and/or edit. In either event, the user may begin to customize the advertisement. For example, a user can add images, ad areas, graphics, groupings of images (e.g. a family of products), etc. A user can also customize the location, size, etc. of such ad elements. These ad elements can be copied and duplicated. In such embodiments, the user may be able to save the customized template for future use, for use by other users, or for use in other ads.

In a preferred embodiment, the user may be presented with options to include pre-defined advertisement elements as well as new advertisement elements that the user may create. A pre-defined advertisement element is one that was created previously and saved into memory (e.g., stored into a database or otherwise on a computer memory). An advantage of using pre-defined advertisement elements is that the business or corporation may provide these as suggestions of or requirements for, products to be offered for a particular ad and/or selling season. This provides the user with a desired base of products to consider, which further reduces the time to customize an advertisement. Alternatively, the pre-defined advertisement element may be saved as part of a template, in which case the next time a template is used, it may be defined to include the pre-defined advertisement element. Preferably, templates include additional areas that permit new products to be advertised. One way of readily identifying areas where new product ads may be placed is by coloring an area of the template with a color. That way, a user readily sees a blank portion on the template and may "import" (or otherwise add by way of an editor) a new advertisement element.

In preferred embodiments, users can upload images, graphics, articles and other advertising elements directly into the system. Once an element is uploaded, the system can check to see if the element conforms to specifications and matches the rules established by the administrator, for example proper DPI, size, color, clipping path, etc. If the image does not confirm to the specifications, the system can provide the user with information as to why the image is unacceptable and offer options for completion. For example the system can suggest correcting and re-uploading the image, upload the unacceptable image anyway, or having the image corrected by another entity. The interface can provide fields to add a title, description, item number, SKU, weight, size, packaging information, price, custom text or other corresponding information. Furthermore, users can crop the newly uploaded images prior to saving. Once entered, the system processes the information and, when finished, makes the new advertisement element available for immediate use.

Another embodiment allows a user to be part of a "public" database of user-uploaded advertisement elements. The "public" database is shared by all users opting into the service. Any image, ad template, item, photo, graphic, article, etc. in the database is available to all users. A user may upload an advertisement element to the "public" database for use by all users, or may upload the advertisement element to a "private" database for use only by that user.

Figure 2:
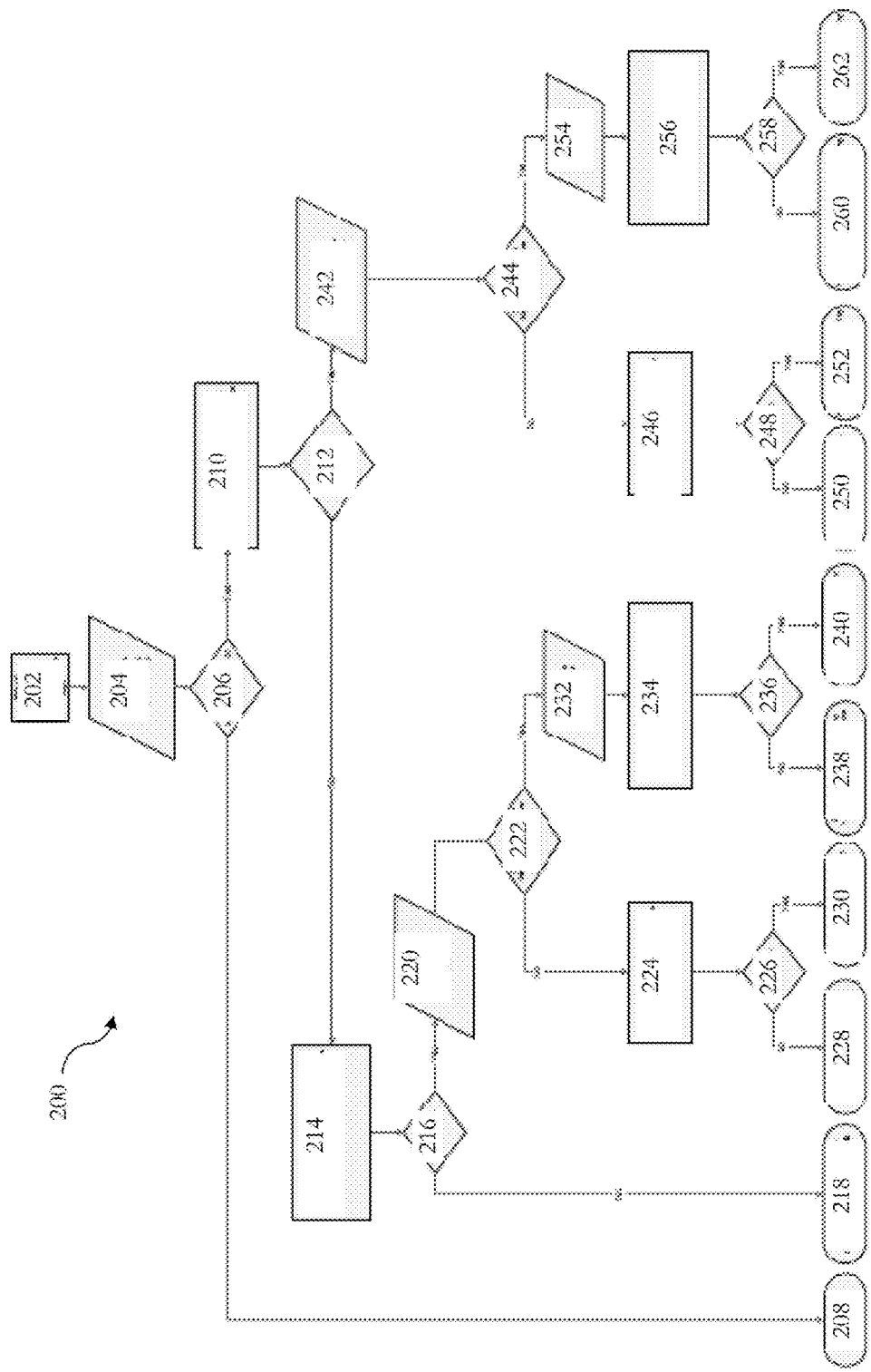
FIG. 2 illustrates a method embodiment.

In the preferred embodiment, the user will select and/or upload each advertisement element to be included in the advertisement. The system will then intuitively recognize and understand historical design attributes and preferences based on the user data and render the selected and/or uploaded advertisement elements based on the attributes and preferences. The design attributes can include, for example, images, placement of logos, text formatting, price, description, or other style attributes. FIG. 2 is a flowchart of an embodiment of a method 200 of rendering the advertisement elements.

Method 200 begins at step 202, where the system obtains information from the user. The information may include, but is not limited to, the advertisement's parameters (e.g. size, type of advertisement, number of advertisement elements per page, placement of advertisement elements (e.g. which advertisement element is designated for which ad space), and themes), the chosen advertisement elements to be inserted into the advertisement (including any image and/or text), and the style preferences of the user and other users (e.g. saved markup records for previously inserted advertisement element). The system can automatically arrange the advertisement elements on the advertisement (e.g. based on a set of priorities) or the user can choose the arrangement of the advertisement elements on the advertisement (either before or after the system automatically arranges the advertisement elements). For each chosen advertisement element, method 200 progresses to step 204, where the system attempts to match the chosen advertisement element with at least one markup record. A markup record is a record of a customized formatting and styling of an advertisement element. The markup record can include, but is not limited to, image size, image position, text size, text font, text color, text position, background color, and rotation. At step 206, the system determines if there is at least one markup record that matches the chosen advertisement element. If there are no matches, at step 208, the system determines that a similar advertisement element to the chose advertisement element has never been used in an advertisement before, spreads the chosen advertisement element out equally over the ad space for the advertisement element, and allows the user to customize the appearance of the chosen advertisement element. Once the user customizes the appearance of the chosen advertisement element, the system saves the user's preferences for future advertisement elements as a new markup record.

On the other hand, if at step 206, the system does find at least one match, the system queries the matches of markup records, at step 210, to determine if, at step 212, any of the matches have similar or proportional ad space dimensions (e.g. height to width ratio) of the chosen advertisement element's ad space dimensions. If none of the matches have similar or proportional ad space dimensions, at step 214, the system queries the matches to determine, at step 216, if any of the matches have a variance in ad space dimensions within 10% of the chosen advertisement element's ad space dimensions. If there are no matches within 10%, the system, at step 218, formats the chosen advertisement element in accordance with the closest matched markup record (e.g. a markup record having a 15% variance, a 20% variance, or a 25% variance in ad space dimensions).

On the other hand, if at step 216, there is at least one markup record within 10% of the chosen advertisement element's ad space dimensions, at step 220, the system filters out the remaining markup records that have ad space dimensions greater than a 10% variance from the chosen advertisement element's ad space dimensions. At step 222, the system determines if the chosen advertisement element contains an image. If the chosen advertisement element does not contain an image, at step 224, the system queries the results, and, at step 226, determines the number of markup records that have a variance in ad space dimensions within 10% of the chosen advertisement element's ad space dimensions and were created by the current user. If there are no markup records that have a variance in ad space dimensions within 10% of the chosen advertisement element's ad space dimensions and were created by the current user, at step 228, the system formats the chosen advertisement element in accordance with the markup records that has a variance in ad space dimensions closest to the chosen advertisement element's ad space dimensions and was created by another user. However, if there is at least one markup record that has a variance in ad space dimensions within 10% of the chosen advertisement element's ad space dimensions and was created by the current user, the system, at step 230, formats the chosen advertisement element in accordance with the markup records that has a variance in ad space dimensions closest to the chosen advertisement element's ad space dimensions and was created by the current user.

If, at step 222, the system determines that the chosen advertisement element has an image, at step 232, the system filters out the markup records that do not have images. At step 234, the system queries the filtered results to determine, at step 236, if any of the remaining markup records were created by the current user and have image dimensions within 10% variance of the image dimensions in the chosen advertisement element. If there is not at least one remaining markup records that was created by the current user and has image dimensions within 10% variance of the image dimensions in the chosen advertisement element, at step 238, the system formats the chosen advertisement element in accordance with the markup record that has the closets variance in image dimension and/or a markup record created by another user. On the other hand, if there is at least one remaining markup records that was created by the current user and has image dimensions within 10% variance of the image dimensions in the chosen advertisement element, at step 240, the system formats the chosen advertisement element in accordance with the markup record that has the closets variance in image dimension and was created by the current user.

Returning to step 212, if at least one of the markup records has similar or proportional ad space dimensions (e.g. height to width ratio) to the chosen advertisement element's ad space dimensions, the system, at step 242 filters out the markup records that do not have similar or proportional ad space dimensions. At step 244, the system determines if the chosen advertisement element contains an image. If the chosen advertisement element does not contain an image, at step 246, the system queries the results, and, at step 248, determines the number of markup records that have similar or proportional ad space dimensions to the chosen advertisement element's ad space dimensions and were created by the current user. If there are no markup records that have similar or proportional ad space dimensions to the chosen advertisement element's ad space dimensions and were created by the current user, at step 250, the system formats the chosen advertisement element in accordance with the markup records that has an ad space dimensions closest to the chosen advertisement element's ad space dimensions and was created by another user. However, if there is at least one markup record that has similar or proportional ad space dimensions to the chosen advertisement element's ad space dimensions and was created by the current user, the system, at step 252, formats the chosen advertisement element in accordance with the markup records that has an ad space dimensions closest to the chosen advertisement element's ad space dimensions and was created by the current user.

If, at step 244, the system determines that the chosen advertisement element has an image, at step 254, the system filters out the markup records that do not have images. At step 256, the system queries the filtered results to determine, at step 258, if any of the remaining markup records were created by the current user and have image dimensions within 10% variance of the image dimensions in the chosen advertisement element. If there is not at least one remaining markup records was created by the current user and has image dimensions within 10% variance of the image dimensions in the chosen advertisement element, at step 260, the system formats the chosen advertisement element in accordance with the markup record that has the closets variance in image dimension and/or a markup record created by another user. On the other hand, if there is at least one remaining markup records that was created by the current user and has image dimensions within 10% variance of the image dimensions in the chosen advertisement element, at step 262, the system formats the chosen advertisement element in accordance with the markup record that has the closets variance in image dimension and was created by the current user.

Method 200 is repeated for each chosen advertisement element until each chosen advertisement element is arranged and formatted on the advertisement. After each advertisement element is arranged and formatted on the advertisement, the user will have the opportunity to reformat the advertisement element. The system will record each reformatted advertisement element and save the data as a new markup record, thereby adding to the database of markup records and providing better rendering of advertisement elements in the future.

In a preferred embodiment, the user is provided with an opportunity to preview the advertisement as it will look when printed. One way to provide this opportunity is with a "preview" button which upon clicking will automatically display or print an image that looks very much like the final advertisement as it should be printed. The system may also electronically display a proof to be accepted before printing an ad. A proof may also be available in the "Archives" section of the program after publishing the ad prior to printing. The proof may also be emailed or provided electronically.

When the advertisement has been finalized (i.e., when the template has been designed and edited to include all of the products and information that the user decided to include), the user may review the preview as displayed by the computer or the system may generate a hard-copy preview or printer's proof for the user to review. How and where the proof is generated depends upon the advertising format that is being used. For example, for a black and white advertisement, the proof may be generated at a printer operated by the user (on the premises of the user). In certain embodiments, the user can print a low-resolution version of the ad. If a multi-colored glossy circular is desired, the proof may be generated by a professional printer that is located remotely relative to the user. To generate a preview, the present invention may transmit electronically the advertisement to a commercial printer, who may process and create an electronic preview or print a hard-copy proof of the final advertisement. In certain embodiments, the user can zoom in and/or out of an ad page.

A user may review the preview to confirm that the draft advertisement is acceptable in terms of content, design, quality, etc. If the user approves of the preview, the final advertisements may be printed, and preferably, in accordance with any printing specification that may have been provided by the user and/or generated by the program. In addition, the invention may offer the user an automatic checking feature of prices, quantities, inventory availability (e.g. in store availability or availability from distributor or manufacturer facilities) or other options (e.g. size, color, composition) against preset or predetermined parameters. In certain embodiments, once an ad is complete, the system can save the changes to the ad made by the user as a data file and can deliver the file to other sources for further processing and production. The ad may be output as an electronic file, for example, the file output may be a pdf, eps, tiff, jpeg, gif, png, mpeg, mp3, mp4, avi, mov, or other applicable file format. For example the system can deliver the file to point of sale systems, main frame computer systems, graphic artists for manual creative development, data-driven output devices, etc. In another embodiment of the present invention, a user may select files to be processed and presented to a target audience through a website, digital display, electronic mail, cellular or wireless technology, etc. The order, sequence, length of time displayed, and other advertisement display functions are controlled by a user through the system.

In one embodiment of the present invention, the methods and systems may provide delivery options. For example, a user may chose from a plurality of delivery options that include a) a direct mailing to potential users whose names and addresses are provided by the user, b) a direct shipping to a newspaper publisher, and c) a direct shipping to the user at one or multiple locations. When a direct mailing is selected, the user may preferably provide a data file of names and addresses of persons who will receive hard copies or electronic direct mailings. The data file may be provided, for example, via the Internet or a storage media (e.g. hard drives, zip disks, CDs, diskettes, flash drives).

Furthermore, the system may integrate with third parties. The integration may include ordering, producing, and/or distributing advertisements. The system can provide data and files necessary to complete a transaction from start to finish. For example, the system can integrate with international printing, packaging and delivery services, direct mail distribution services, stock photography and image services, postcard printing and delivery services, and email marketing services. In addition to advertising service providers, a third party may also be other businesses, manufacturers, distributors, etc., in affiliated or interested industries. In certain embodiments, the third party has access to the system. The third party can upload data and advertisement elements, mange the data, and create pre-merchandised or suggested ads that are posted to users. When users login, the users may be alerted to these new ads and may be able to customize them for the user's specific businesses and needs.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

I claim:

1. A method of automatically rendering an advertisement element on an advertisement, comprising one or more computers executing:
    obtaining an advertisement element to be rendered on the advertisement from a user;
    comparing the advertisement element to a set of stored markup records;
    determining which stored markup record is closest in at least one attribute to the advertisement element;
    rendering the advertisement element in accordance with the closest markup record; and
    displaying the rendered advertisement element on the advertisement.

2. The method of claim 1, wherein the advertisement element is chosen from a database of advertisement elements or created newly by a user.

3. The method of claim 1, wherein the set of stored markup records includes at least one markup record previously saved by the user.

4. The method of claim 3, further comprising:
    determining if the at least one stored markup record saved by the user is within a predetermined variance in at least one attribute to the advertisement element;
    rendering the advertisement element in accordance with the markup record saved by the user if the markup record saved by the user is within the predetermined variance; or
    rendering the advertisement element in accordance with the closest markup record saved by another if the markup record saved by the user is not within the predetermined variance.

5. The method of claim 4, wherein the variance is within a 10% height to width ratio.

6. The method of claim 1, further comprising:
    obtaining customizations to the rendered advertisement element from the user; and
    saving the customizations as a new markup record.

7. The method of claim 1, wherein the at least one attribute is chosen from advertisement element height to width ratio, image height to width ratio, advertisement dimensions, image dimensions, text dimensions, text content, and advertisement content.

8. The method of claim 1, wherein if there are no stored markup records or no markup record is close in at least one attribute to the advertisement element, the advertisement element is distributed evenly on the advertisement.

9. The method of claim 1, wherein the markup record comprises style preferences of the user and others.

10. The method of claim 9, wherein the style preferences include at least one of image size, image position, text size, text font, text color, text position, background color, and rotation.

11. The method of claim 10, wherein the advertisement element is rendered in accordance with the style preferences of the markup record.

12. The method of claim 1, wherein the advertisement element comprises at least one of text, an image, and a background.

* * * * *